United States Patent [19]

Sedy et al.

[11] Patent Number: 5,722,665
[45] Date of Patent: Mar. 3, 1998

[54] SPIRAL GROOVE FACE SEAL

[75] Inventors: Josef Sedy; Artur Zobens, both of Mount Prospect, Ill.

[73] Assignee: Durametallic Corporation, Kalamazoo, Mich.

[21] Appl. No.: 791,413

[22] Filed: Jan. 24, 1997

Related U.S. Application Data

[63] Continuation of Ser. No. 612,608, Mar. 8, 1996, abandoned, which is a continuation of Ser. No. 461,371, Jun. 5, 1995, abandoned, which is a continuation of Ser. No. 081,687, Jun. 24, 1993, abandoned, which is a continuation-in-part of Ser. No. 841,578, Feb. 26, 1992, abandoned.

[51] Int. Cl.⁶ ........................................................ F16J 15/34
[52] U.S. Cl. ............................... 277/96.1; 277/96; 277/81 R
[58] Field of Search ............................ 277/96, 96.1, 81 R

[56] References Cited

U.S. PATENT DOCUMENTS

| | | |
|---|---|---|
| 3,033,577 | 5/1962 | Spiess . |
| 3,109,658 | 11/1963 | Barrett et al. . |
| 3,499,653 | 3/1970 | Gardner . |
| 3,527,465 | 9/1970 | Guinard . |
| 3,640,541 | 2/1972 | Taschenberg . |
| 3,675,935 | 7/1972 | Ludwig et al. . |
| 3,744,805 | 7/1973 | Heinrich . |
| 3,782,737 | 1/1974 | Ludwig et al. . |
| 3,804,424 | 4/1974 | Gardner . |
| 4,212,475 | 7/1980 | Sedy . |
| 4,423,879 | 1/1984 | Takenaka et al. . |
| 4,471,966 | 9/1984 | Timmermans et al. . |
| 4,836,561 | 6/1989 | Lebeck et al. . |
| 4,889,348 | 12/1989 | Amundson et al. . |
| 4,972,986 | 11/1990 | Lipschitz . |
| 5,039,113 | 8/1991 | Gardner . |
| 5,058,905 | 10/1991 | Nosowicz et al. . |
| 5,066,026 | 11/1991 | Heck et al. . |
| 5,092,612 | 3/1992 | Victor et al. . |
| 5,143,384 | 9/1992 | Lipschitz . |
| 5,169,159 | 12/1992 | Pope et al. . |
| 5,174,584 | 12/1992 | Lahrman . |
| 5,180,173 | 1/1993 | Kimura et al. . |
| 5,201,531 | 4/1993 | Lai . |

FOREIGN PATENT DOCUMENTS

| | | |
|---|---|---|
| 0 369 295 | 5/1990 | European Pat. Off. . |
| 19 64 150 | 7/1970 | Germany . |
| 2-31268 | 12/1984 | Japan . |
| 2-31269 | 12/1984 | Japan . |
| 2-236067 | 9/1990 | Japan . |
| 4-54366 | 5/1992 | Japan . |
| 920 892 | 3/1963 | United Kingdom . |

OTHER PUBLICATIONS

"Spiral Groove Bearings", E. A. Muijderman, 1966 (107 pages).

"Numerical, Analytical, Experimental Study Of Fluid Dynamic Forces In Seals", Wilbur Shapiro, Antonio Artiles, Bharat Aggarwal, Jed Walowit, Mahesh Athavale and Andrzej Przekwas, 1991 (316 pages).

*Primary Examiner*—Daniel G. DePumpo
*Attorney, Agent, or Firm*—Flynn, Thiel, Boutell & Tanis, P.C.

[57] ABSTRACT

Non-contacting spiral groove face seal for shafts rotating at high pressures and high speeds with combination of two groove patterns on one of the two sealing faces of mating sealing rings; one pattern relatively deep, the other relatively shallow. The relatively deep spiral-shaped groove pattern is optimized for hydrodynamic operation and on shaft rotation pumps the sealed fluid in-between sealing faces to set the running clearance. The relatively shallow pattern is designed to prevent a friction lock of the sealing faces hydrostatically at starts and stops of shaft rotation by admitting controlled amount of the sealed fluid between the sealing faces when the shaft is at or near to a stationary condition.

22 Claims, 3 Drawing Sheets

SPIRAL GROOVE FACE SEAL

CROSS REFERENCE TO RELATED APPLICATIONS

This application is a continuation of U.S. Ser. No. 08/612,608, filed Mar. 8, 1996 now abandoned, which in turn is a continuation of U.S. Ser. No. 08/461,371, filed Jun. 5, 1995, now abandoned, which in turn is a continuation of U.S. Ser. No. 08/081,687, filed Jun. 24, 1993, now abandoned, which in turn is a continuation-in-part of U.S. Ser. No. 07/841,578, filed Feb. 26, 1992, now abandoned.

FIELD OF THE INVENTION

This invention relates to sealing devices for rotating shafts, where a sealed fluid is employed to generate hydrostatic-hydrodynamic or aerostatic-aerodynamic forces between interacting face-type sealing elements, one stationary, another rotating. These forces provide for slight separation and non-contacting operation of the above sealing elements, thereby minimizing face wear and friction power losses while maintaining low fluid leakage.

BACKGROUND OF THE INVENTION

Rotary fluid film face seals, also called non-contacting face seals, are usually applied to high-speed, high-pressure rotating equipment, where the use of ordinary mechanical face seals with face contact would result in excessive heat generation and wear. Non-contacting operation avoids this undesirable face contact at times when the shaft is rotating above certain minimum speed, which is called a lift-off speed.

There are various ways of accomplishing the above non-contacting operation, of which one of the most successful includes the application of a shallow spiral groove pattern to one of the sealing faces. The sealing face opposite the face is relatively flat and smooth. The face area where these two sealing faces define a sealing clearance is called the sealing interface.

The above-mentioned spiral groove pattern on one of the sealing faces normally extends inward from the outer circumference and ends at a particular face diameter called the groove diameter.

It is important to end the spiral pattern at the groove diameter, which is larger than the inner diameter of the seal interface. The remaining non-grooved area between the groove diameter and the inner interface diameter serves as a restriction to fluid outflow. Fluid delivered by the spiral pattern must pass through this restriction and it can do so only if the sealing faces separate. The way this works is through pressure build-up. Should the faces remain in contact, fluid will be compressed just ahead of the restriction, building up pressure. Pressure will cause separation force, which will eventually become larger than the forces that hold faces together. In that moment the sealing faces separate and allow the fluid to escape. During operation of the seal, an equilibrium establishes itself between fluid inflow through spiral pumping and fluid outflow through face separation. Face separation is therefore present as long as the seal is operating, which means as long as one face is rotating in relation to the opposite face. Yet spiral pumping is not the only factor that will determine the amount of the separation between the sealing faces. Just as the spirals are able to drive the fluid into the non-grooved portion of the sealing interface past the groove diameter, so can the pressure differential. If enough of a pressure difference exists between the grooved end of the interface and the non-grooved end, fluid will also be forced into the non-grooved portion of the interface, thereby separating the faces and forming the clearance.

Both ways in which clearance can be formed between the sealing faces, one with speed of rotation, the other with pressure differential, are distinct and separate, even though on the operating seal the effects of both combine. If there is no pressure difference and the seal face separation occurs strictly due to face rotation, forces due to fluid flow are known as hydrodynamic forces, if the fluid sealed is a liquid; aerodynamic forces, if the fluid sealed is gas.

On the other hand, if there is no mutual rotation between the two sealing faces and face separation is strictly the consequence of pressure differential between both ends of the sealing interface, forces due to fluid flow are called hydrostatic forces, should the fluid sealed be liquid; aerostatics forces, should the fluid sealed be gas. In the following, the terms hydrostatic and hydrodynamic are used for both liquid and gas effects, since these terms are used more often than aerostatic and aerodynamic and latter has also another meaning.

A typical spiral groove seal needs to provide acceptable performance in terms of leakage and the absence of face contact during all regimes of seal operation. It must do so not only at top speed and pressure, but also at standstill, at start-up, acceleration, at periods of equipment warm-up or at shutdown. At normal operating conditions, pressure and speed vary constantly, which results in continuous adjustments to the running clearance. These adjustments are automatic; one of the key properties of spiral groove seals is their self-adjustment capability. On change in speed or pressure, the face clearance adjusts automatically to a new set of conditions. Hydrostatic and hydrodynamic forces cause this adjustment.

The operating envelope of speeds and pressures is usually very wide and a seal design of necessity must be a compromise. For its performance to be acceptable at near-zero speed or pressure, it is less than optimum at operating speed and pressure. This is simply due to the fact that, both in terms of pressure and speed, the seal has to be brought up to operating conditions from zero speed and zero pressure differential.

Especially critical to seal operation is the start-up. If the seal is applied to a centrifugal gas compressor, the full suction pressure differential is often imposed onto the seal before the shaft starts turning. This presents a danger in that the sealing faces will lock together with friction. Face lock results when the hydrostatic force is insufficient to counter pressure forces that maintain the seal faces in contact. Face lock can lead to seal destruction, in which excessive breakaway friction between contacting seal faces can cause heavy wear or breakage of internal seal components.

First then, spiral grooves must be able to separate faces hydrodynamically for full speed non-contacting operation. This normally requires fairly short and relatively deep spiral grooves. Second, the spiral grooves must be able to unload faces hydrostatically for start/stops to prevent face lock. For this, the grooves have to be extended in length. The extended grooves in turn cause more separation and leakage during full speed operation. The full speed leakage of a typical 3.75 inch shaft seal With short and relatively deep spirals would be about 0.9 SCFM (this stands for Standard Cubic Feet per Minute) at 1,000 psig and 10,000 rpm. However, full speed leakage for such a seal with extended grooves would reach 2.4 SCFM at the same conditions, almost triple the previous value. The constant burden of larger-than necessary leakage represents significant operating costs.

Prior art, leading to the current spiral groove design practice goes back to U.S. Pat. No. 3,109,658 issued to Barrett and others. Two opposing spiral grooves pumped oil against each other, which developed a liquid barrier capable of sealing gas. Such an arrangement was limited in pressure as well as speed capability, inherent in the use of liquid forces to seal gas.

The next important prior art resides in U.S. Pat. No. 3,499,653 issued to Gardner. While incorporating a currently popular interface design with partial spiral grooves, Gardner relied heavily on hydrostatic effects, in which an interface gap would be designed with taper shape narrower at the non-grooved end and wider at the spiral grooves. The effect of the spiral grooves and therefore the hydrodynamic forces would thus be suppressed, since spiral groove pumping would become less effective across wider gaps. This likewise affected the stability of the seal and limited its top pressure and speed capability.

Subsequent major prior art was granted by U.S. Pat. No. 4,212,475 to Sedy. Here the fact, that the spiral groove itself acts as a hydrostatic as well as hydrodynamic pattern was used to eliminate the need for taper shape of the gap so a considerable degree of spiral groove hydrodynamic force could then be applied to impart a self-aligning property to a sealing interface. The self-aligning property would force the sealing interface back towards parallel position, regardless of whether deviations from parallel position curing seal operation occurred in radial or tangential directions. This resulted not only in an overall improvement of the stability of seal operation, but also in increased performance limits in terms of pressure and speed.

SUMMARY AND OBJECT OF THE INVENTION

This invention is aimed at improvement in the performance of the spiral groove seal as well as further increase in its pressure and speed limits beyond those within reach of prior art designs. The invention combines two spiral groove patterns into one with the aim of providing a seal with a hydrostatic opening force for safe start-stops but without the penalties of excessive hydrodynamic effects, large clearance and high leakage.

In a preferred embodiment of this invention, one spiral groove pattern is designed and optimized to remove seal face lock condition while it remains closed with near-zero leakage; another spiral groove pattern is designed for optimum performance of the seal at operating speed and pressures. Thus it is no longer necessary to compromise one and only spiral groove pattern of prior art to satisfy both start/stop and operating conditions simultaneously. Resulting seal operates at lesser leakage rates, is therefore capable of running at higher speeds and pressures, before excessive leakage rates may cause onset of instability.

Other objects and purposes of the invention will be apparent to persons familiar with structures of this general type upon reading the following specification and inspecting the accompanying drawings.

Figure 1:
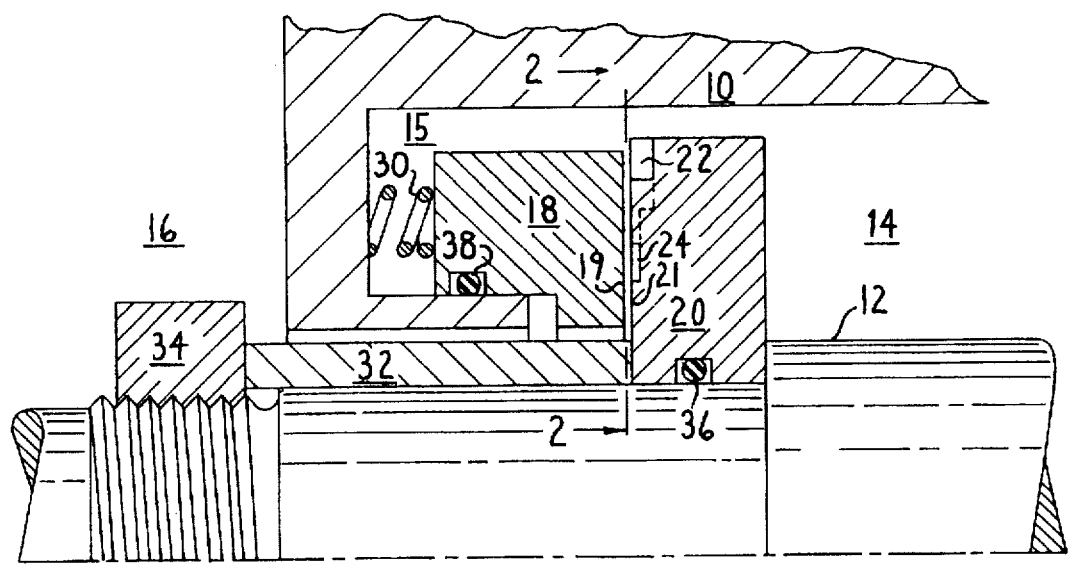
FIG. 1 is an axial quarter section view in elevation of a seal, constructed in accordance with this invention, showing the relative position of the various parts, when the shaft is rotating.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure and designated parts thereof. Said terminology will include the words specifically mentioned, derivatives thereof, and words of similar import.

DETAILED DESCRIPTION

Referring first to FIG. 1, there is shown the invention and its environment. This environment comprises a housing 10 and a rotatable shaft 12, extending through said housing. The invention is applied to seal a fluid within the annular space 14 and to restrict its escape into the fluid environment at 16. Basic components of the invention comprise an annular, axially movable sealing ring 18, having a radially extending face 19 in sealing relationship with a radially extending face 21 of an annular rotatable sealing ring 20. The sealing ring 18 is located within cavity 15 of housing 10 and held substantially concentric to rotatable sealing ring 20. Between housing 10 and the sealing ring 18 is a plurality of springs 30, spaced equidistantly around the cavity 15 of housing 10. Springs 30 urge the sealing ring 18 into engagement with the sealing ring 20. An O-ring 38 seals the space between the sealing ring 18 and the housing 10. The sealing ring 20 is retained in the axial position by a sleeve 32. Sleeve 32 is concentric with and locked on the shaft 12 by locknut 34, which is threaded on shaft 12 as shown. O-ring seal 36 precludes leakage between the sealing ring 20, and the shaft 12. In operation, radially extending face 21 of the sealing ring 20 and radially extending face 19 of the sealing ring 18 are in sealing relationship, maintaining very narrow clearance, generated by combination of two spiral groove patterns 22 and 24, chemically etched into the sealing face 21 of the sealing ring 20. Arrangements with said spiral patterns etched into the sealing face 19 of the sealing ring 18 are also effective. Said narrow clearance prevents generation of friction heat and wear, yet limits outflow of the sealed fluid, present at space 14.

Figure 2:
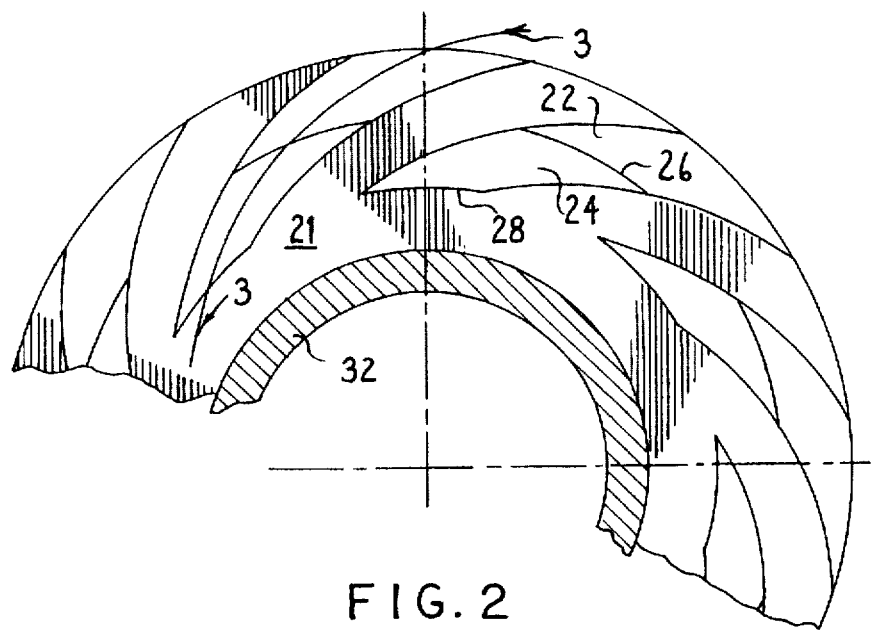
FIG. 2 is an end view in a section, taken along line 2—2 in FIG. 1, illustrating one of the sealing rings of the preferred embodiment of this invention.

FIG. 2 shows an elevation view of the sealing face 21 of the sealing ring 20 with two superimposed patterns of spiral grooves 22 and 24 in the direction 2—2, according to FIG. 1. Spiral grooves 22 and 24 shown are directed counterclockwise and inward for a particular direction of shaft rotation and will be directed clockwise and inward for the opposite direction of shaft rotation. The inner spiral groove pattern 24 is an extension of outer spiral groove pattern 22 and they are separated by concentric circumferential step segments 26. Inner end of spiral groove pattern 24 is delimited by concentric circumferential step segments 28.

Figure 3:
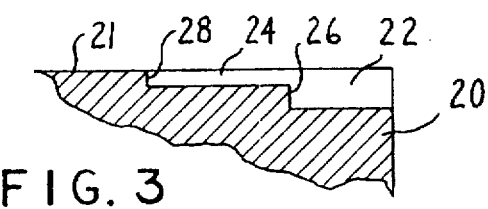
FIG. 3 is a fragmentary view in section, taken along the line 3—3 in FIG. 2 through the spiral grooves in the sealing ring surface and showing the groove portions of uniform depth.
Figure 8:
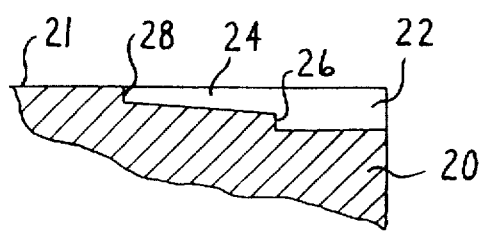
FIG. 8 is a fragmentary view in section, similar to FIG. 3, showing yet another embodiment.
Figure 9:
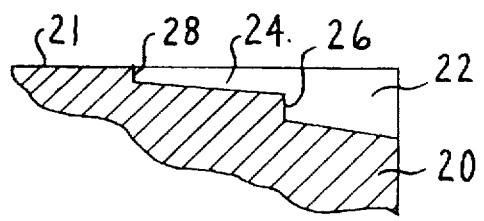
FIG. 9 is a fragmentary view in section, similar to FIG. 8, showing a further embodiment.

FIGS. 3, 8 and 9 show spiral grooves 22 and 24 in section, taken along the line 3—3 in FIG. 2. Spiral groove 22 is recessed into sealing face 21 between step segment 26 and outer periphery of sealing ring 20, forming relatively deep depressions. Spiral grooves 24 are adjacent to spiral grooves 22 at step segments 26 and are delimited by step segments 26 and 28, forming relatively shallow depressions. The steps 26 at the ends of the spiral grooves 22 define an abrupt or damlike transition between the grooves 22 and 24, although such steps obviously do not have to extend perpendicularly as illustrated by FIG. 3.

Figure 4:
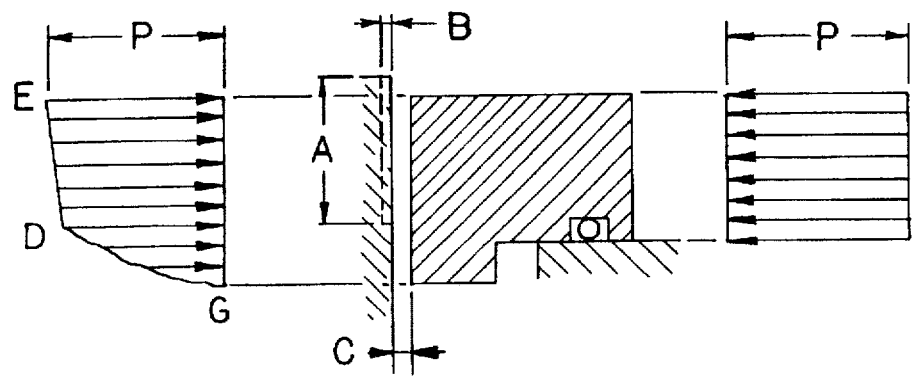
FIG. 4 is a schematic side elevation view in section of the sealing interface and an axially movable sealing ring with depiction of axial forces, acting on it.

FIG. 4 shows the axially movable sealing ring, positioned opposite another sealing ring of simple spiral groove pattern per prior art, both separated by clearance C. Spiral groove pattern shown is delimited by dimensions A and B. On both sides of axially movable sealing ring is the depiction of axial forces in equilibrium. Axial forces are shown as multiple arrows, pictured within a field, defined by pressure distribution across front and the back of the sealing ring shown. Should these pressure distributions change, force balance will change and resulting force difference will shift the sealing ring to readjust the face separation, whereupon forces will again restore their equilibrium.

In a wide envelope of seal operating points, the very first one is the moment, when shaft begins to turn. Normally at that point, seal is already holding pressure differential. What is needed in order to start turning the shaft is slight clearance C or zero clearance, but on the verge of opening, the case when closing and opening forces are nearly equal. What is to be avoided is large clearance, associated with heavy leakage and zero clearance with closing force much larger than opening force. Then sealing faces would be locked together by friction and should shaft start turning, seal damage may result.

Condition of zero clearance on the verge of opening is most desirable and according to this invention also attainable at wide range of sealed pressures. At this condition, equipment can stand by at full pressure for months, ready to start operating, with near zero leakage and minimal product loss.

Start-up condition is governed by hydrostatic principles, since shaft is not turning yet. Spiral groove acts as a step in average clearance between faces. Per FIG. 4, this average clearance is then larger at the grooved area, narrower at the inner non-grooved area and one can then define a ratio of outer to inner clearance. Hydrostatic principle applicable here teaches, that if one then changes this ratio by making spiral grooves deeper or shallower, that means by changing dimension B per FIG. 4, clearance C will change as a consequence. Change will be such, that clearance C will increase with increase in B and vice versa. Similar effect occurs also with spiral grooves, depth of which decreases on the way from outer face periphery inward. The larger the groove depth at the outer periphery and the steeper the groove depth decrease, the larger the equilibrium clearance C and vice versa.

Figure 6:
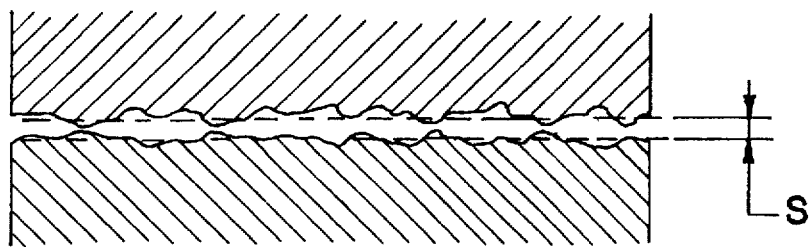
FIG. 6 is a magnified view in section of two flat surfaces in contact.

According to this invention, a spiral groove pattern of relatively large dimension A and relatively small dimension B per FIG. 4 will impart a unique hydrostatic property to the seal, where its hydrostatic clearance C will be so small, that it will approach the average clearance due to roughness peaks and valleys on the two sealing surfaces in contact. This situation is shown magnified on FIG. 6 by dimension S. No surface, no mater how smooth, is absolutely flat. It has always certain roughness with miniature peaks and valleys and two such surfaces in contact will always leave passages open to slight fluid flow among contacting roughness peaks. Dimension S shows average clearance due to roughness effect.

Aim of this invention is to design hydrostatic clearance C to approach dimension S in as wide a pressure range as possible, without opening the sealing faces. Then sealing faces will be closed, but with opening and closing forces nearly equal, preventing face friction lock.

Figure 5:
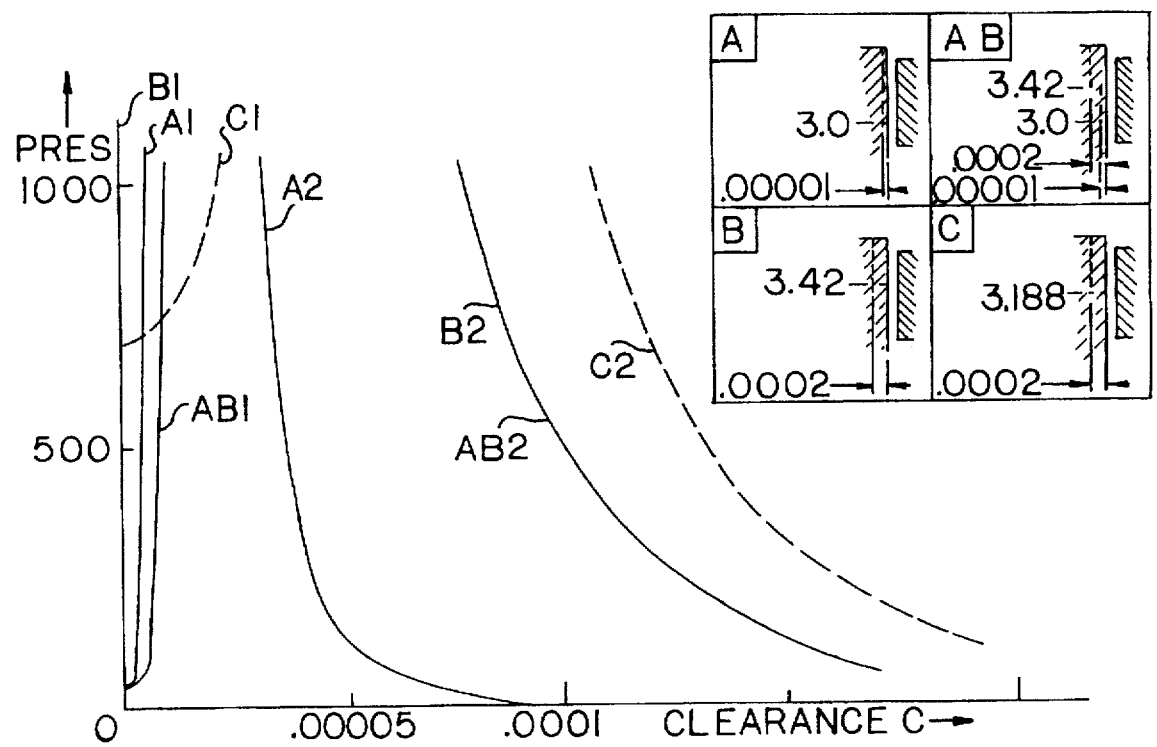
FIG. 5 is a pressure-clearance diagram, showing hydrostatic and hydrodynamic clearances for four different spiral groove configurations.

Above is demonstrated by chart per FIG. 5, where variations in interface clearance due to pressure change are shown for individual spiral groove patterns as well as for new pattern combination according to this invention.

Chart shows eight curves, two each for three single patterns and additional two for pattern combination. One of the curves coincides with vertical axis and another two curves coincide with each other, so only six curves are plotted in FIG. 5. Spiral groove patterns, corresponding to these curves are shown in cross-section at the upper right side of FIG. 5 together with dimensional information.

First there is a spiral groove pattern A of 3 inch groove diameter and 0.00001 inch groove depth, designed for hydrostatic lift. Its clearance-pressure characteristic at zero speed is shown by curve A1. Its character is such, that already at 40 psig of pressure, there is slight clearance present between the sealing faces. Clearance is calculated and actual seal faces will exhibit some surface roughness, where subject clearance will not necessarily be large enough to eliminate face contact. Yet it will be sufficient to bring approximate equivalence between closing and opening forces, preventing sealing face lock and danger of seal damage. In fact, hydrostatic lift per spiral groove pattern A represents ideal conditions of light face contact, therefore just trace leakage of fluid among face roughness asperities, leakage which does not change much, whether face contact is light or heavy. Seal faces are on the verge of opening at wide range of pressures and shaft rotation can start at any of these pressures without danger of seal damage. Increase in depth of pattern A would lift faces apart, causing significant leakage, an undesirable situation for equipment, that may be on standby under pressure for long periods of time.

Figure 7:
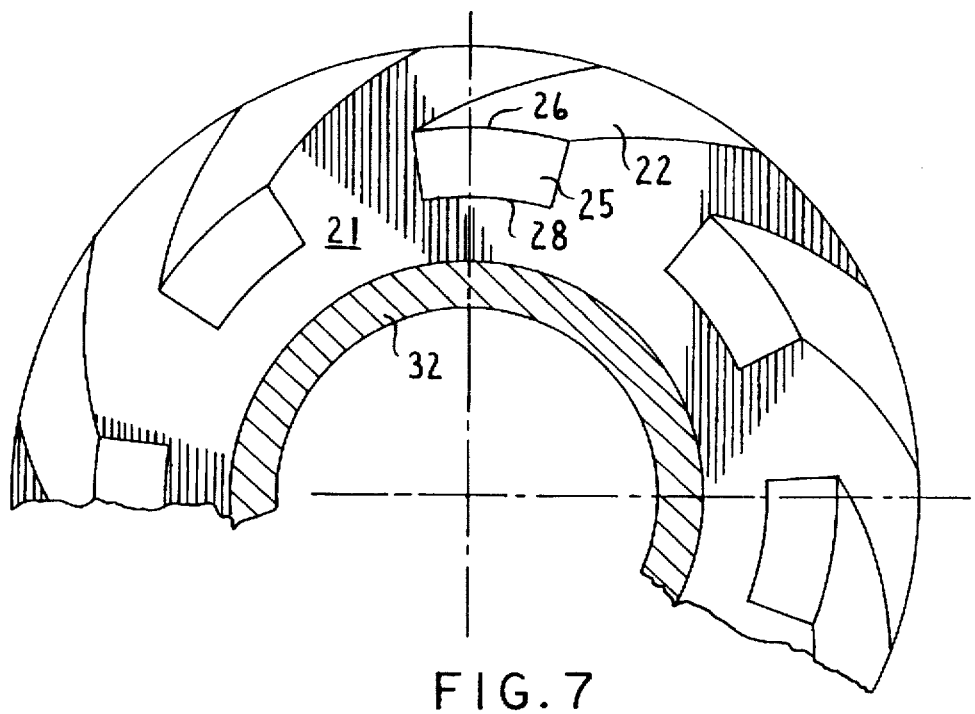
FIG. 7 is a schematic end view similar to FIG. 2, showing another embodiment.

It should be noted, that pattern A does not have to be in shape of a spiral to be effective. Per FIG. 7, which is a view similar to FIG. 2, it would be also hydrostatically effective as a pattern of shallow radial grooves 25 at deeper outer spiral grooves 22. Radial grooves 25 result, if spiral angle of groove 24 per FIG. 2 increases. Groove shapes between these two extremes are also effective and, under some circumstances, the shallow grooves 24 of FIG. 2 may be angled in the opposite circumferential direction relative to the deep grooves 22.

Corresponding full speed characteristic for subject pattern A is shown at A2. Dynamics of high speed shaft rotation dictate certain minimal clearances for non-contacting seal operation and clearances as per A2 would not be sufficient. Pattern A alone is therefore not acceptable.

Pattern B of 3.42 inch groove diameter and 0.0002 inch groove depth on the other hand is designed for optimum full speed operation. As such, it is relatively deep for it to pump enough fluid into the seal interface to separate faces sufficiently, relatively short to provide minimal possible hydrostatic effect to prevent it from interfering with any other pattern, with which it may be potentially combined. Pattern B will not lift the faces hydrostatically, therefore its B1 curve coincides with vertical chart axis for zero clearance at all pressures. Such pattern would cause face lock at most pressures, therefore pattern B alone would also be unacceptable. Characteristic B2 shows sufficient seal face clearance for hydrodynamic non-contacting operation.

Third pattern is according to this invention, identified as AB and consists of pattern A, combined with pattern B. Static lift curve AB1 shifts to the right of A1 due to slight remaining effect of B-part of the pattern. Hydrodynamic lift curve AB2 almost coincides with curve B2 since AB2 clearances exceed B2 clearance by rather small margin of less than 5%. This pattern therefore satisfies both criteria of hydrostatic lift for no face lock and satisfactory hydrodynamic clearance for low leakage and represents therefore an improvement over prior art.

For comparison purposes, single pattern C with 3.188 inch groove diameter and 0.0002 inch groove depth of prior art for both hydrostatic lift and hydrodynamic operation is shown with dash lines C1 and C2. Pattern C was designed to lift faces of the seal hydrostatically just enough to assure start-ups at full pressure. An effort to further shorten this pattern for less leakage would result in hydrostatic face lock. It is to be noted here, how relatively unsuitable is deep hydrodynamic groove for hydrostatic lift. As C1 curve shows, seal faces tend to open only at high pressures, yet on opening quickly develop clearance. Need to extend the pattern length to remove face lock considerably penalizes hydrodynamic operation and shifts C2 curve significantly to the right of curves B2 and AB2.

Since leakage would change roughly with third power of clearance, increase in leakage from B2/AB2 to C2 at 1.000 psig means increase from about 0.9 SCFM to about 2.4 SCFM, which is by almost 170%.

As can be seen, AB double pattern per this invention provides for significant savings in leakage, when compared to prior art pattern C. Single pattern B of similar hydrodynamic behavior to AB cannot be used, since it does not provide enough hydrostatic lift and would lock faces. Single pattern A also cannot be used, since it only present face lock, but would not assure non-contacting operation at full pressure, full speed.

In the improved double pattern of this invention, the radially outer deep grooves 22 may have a maximum depth of 0.001 inch, although a more practical maximum depth for the deep grooves 22 is 0.0005 inch, and the preferred depth of the deep grooves 22 is in the range of from about 0.0001 to about 0.0003 inch. As to the shallow grooves, they have a depth which is preferably in the range of from about 0.00001 to about 0.0001 inch, with the depth of the shallow grooves preferably being no more than 0.5 times the depth of the deep grooves, with the shallow grooves preferably having a depth in the range of between about 0.05 and about 0.25 times the depth of the deep grooves.

While the invention as described above provides two sets of grooves of different depths, it will be appreciated that this invention can be extrapolated to provide additional groove sets, such as three groove sets, all of different depths so as to further improve and refine the combination of hydrostatic and hydrodynamic properties provided by the seal.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A seal device for sealing a fluid at a space between a housing and a rotatable shaft, comprising:

a first seal ring, mounted on said shaft for rotation therewith and having a planar front sealing surface;

a second seal ring, being substantially coaxial with said first seal ring and having a planar sealing surface defining a clearance with said first seal ring planar front sealing surface;

one of said seal rings being axially movable, said axially movable seal ring being acted upon by said fluid to close said clearance;

an elastic means for biasing said axially movable seal ring towards other said seal ring to close said clearance;

one of said planar sealing surfaces having a plurality of grooves formed therein for introducing said fluid between said planar sealing surfaces to thereby urge said planar sealing surfaces away from one another, said grooves arranged in spaced relation to each other, having a first relatively deep and substantially spiral portion extending inwardly from a first circumference of said planar surface toward a second circumference thereof, and a second relatively shallow portion in an abutment with said first relatively deep portion and extending therefrom toward said second circumference;

said abutment being an abrupt step-like change in groove depth;

a maximal depth of said relatively deep portion not exceeding 0.001 inches;

said relatively shallow portion being separated by an annular ungrooved surface from said second circumference of said one planar sealing surface; and said first circumference communicating with said fluid.

2. A seal device according to claim 1, wherein said planar sealing surfaces are substantially parallel with each other and substantially perpendicular to the axis of rotation of said shaft.

3. A seal device according to claim 1, in which said shallow portions of said plurality of grooves are substantially spiral in shape.

4. A seal device according to claim 3, in which both said deep and said shallow portions of said plurality of grooves are substantially uniform in depth.

5. A seal device according to claim 3, in which said deep portions of said plurality of grooves extend from an outer circumference of said grooved planar sealing surface.

6. A seal device according to claim 5, in which a ratio of depth of said shallow portions of said plurality of grooves to said deep portions of said plurality of grooves is in the range between 0.05 and 0.25.

7. A seal device according to claim 1, in which the shallow portions of said plurality of grooves project solely radially.

8. A mechanical seal device for sealing a fluid at a space between a housing and a rotatable shaft, comprising:

a first seal ring mounted on said shaft for rotation therewith and having a first planar sealing surface;

a second seal ring supported nonrotatably relative to the housing and disposed substantially coaxial with said first seal ring and having a second planar sealing surface disposed axially adjacent and opposite said first sealing surface for defining a narrow clearance therebetween, said first and second planar sealing surfaces where they oppose one another defining therebetween an annular seal region which extends radially between first and second circumferences;

one of said seal rings being axially movable;

elastic means for biasing said axially movable seal ring toward the other said seal ring to close said clearance;

first groove means formed in one of said planar sealing surfaces for creating a hydrodynamic fluid bearing in the clearance between said first and second sealing surfaces, and second groove means formed in said one sealing surface for creating a hydrostatic fluid bearing in the clearance between said first and second sealing surfaces;

said first groove means including a plurality of first relatively deep and substantially spirally-shaped groove portions arranged in circumferentially spaced relationship to each other and extending inwardly from said first circumference, and said second groove means comprising a plurality of second relatively shallow groove portions which join to closed ends of said first groove portions and constitute extensions thereof, the closed ends of said first groove portions defining an abrupt steplike change in groove depth between said first and second groove portions;

said closed ends being disposed generally at a diameter which is disposed radially between said first and second circumferences, said second groove portions projecting from said diameter toward but terminating short of said second circumference, said second groove portions being separated from said second circumference by an annular ungrooved surface portion of said one sealing surface; and said first circumference being of greater diameter than said second circumference and said first groove portions projecting radially inwardly from said first circumference and joining to said second groove portions which project inwardly toward said second circumference, said second groove portions having a depth in the range of about 0.00001 to about 0.0001 inch, and said second groove portions having a maximum depth of about 0.25 times the maximum depth of the first groove portions.

9. A seal device according to claim 8, wherein said first groove portions have a depth in the range of about 0.0001 to about 0.0003 inch.

10. A seal device according to claim 9, wherein said second groove portions are angled inwardly toward said second circumference.

11. A seal device according to claim 9, wherein said second groove portions project solely radially toward said second circumference.

12. A seal device for sealing a fluid at a space between a housing and a rotatable shaft, comprising:

a first seal ring, mounted on said shaft for rotation therewith and having a first planar front sealing surface;

a second seal ring being substantially coaxial with and axially adjacent said first seal ring and having a second planar sealing surface disposed opposite and defining a clearance with said first sealing surface;

one of said seal rings being axially movable, said axially movable seal ring being acted upon by said fluid to close said clearance; an elastic means for biasing said axially movable seal ring towards other said seal ring to close said clearance; and one of said planar sealing surfaces having a plurality of grooves formed therein for introducing said fluid between said planar sealing surfaces to thereby urge said sealing surfaces away from one another, said grooves arranged in spaced relation to each other and having a first relatively deep and substantially angled portion extending inwardly from a first circumference of said one planar surface and a second relatively shallow portion contiguous with said first relatively deep portion, said first deep portion where it joins to said second shallow portion defining a relatively abrupt change in groove depth, and said first circumference communicating with said fluid;

said shallow portion being separated by an annular ungrooved surface from a second circumference of said one planar sealing surface; and said deep portions of said plurality of grooves measuring 0.0001 to 0.0003 inches in depth and said shallow portions of said plurality of grooves being of lesser depth than said deep portions and measuring 0.00001 to 0.0001 inches in depth.

13. A seal device according to claim 12, in which ratio of depth of said shallow portions of said plurality of grooves to said deep portions of said plurality of grooves is in the range between 0.05 and 0.25.

14. Device for sealing a fluid at a space between a housing and a rotatable shaft, comprising a first seal ring, mounted on said shaft for rotation therewith and having a back surface and a planar front sealing surface, a second seal ring, being substantially coaxial with said first seal ring and having a planar sealing surface defining a clearance with said first seal ring planar front sealing surface, one of said seal rings being axially movable, said axially movable seal ring being acted upon by said fluid to close said clearance, an elastic means, connected between said housing and said axially movable seal ring for biasing said axially movable seal ring towards other said seal ring to close said clearance, one of said planar sealing surfaces having a plurality of grooves formed therein for introducing said fluid between said planar sealing surfaces to thereby urge said planar sealing surfaces away from each other, said grooves arranged in spaced relation to each other, having a first relatively deep and substantially angled portion extending inwardly from a first circumference of said planar surface and a second relatively shallow portion contiguous with said first relatively deep portion, said second portion projecting solely radially inwardly and having straight sides, and said second shallow portion of said grooves being separated by an annular ungrooved surface from a second circumference of said grooved planar sealing surface.

15. Device according to claim 14, wherein said planar sealing surfaces are substantially parallel with each other and substantially perpendicular to the axis of rotation of said shaft.

16. Device according to claim 14, in which both said deep and said shallow portions of said plurality of grooves are substantially uniform in depth.

17. Device according to claim 14, in which said relatively shallow portions of said plurality of grooves are decreasing in depth in the direction away from said relatively deep portions of said plurality of grooves.

18. Device according to claim 17, in which said relatively deep portions of said plurality of grooves are decreasing in depth in the direction towards said relatively shallow portions of said plurality of grooves.

19. Device according to claim 14, in which said deep portions of said plurality of grooves extend from the outer circumference of said grooved planar sealing surface.

20. Device according to claim 19, in which ratio of depth of said shallow portions of said plurality of grooves to said deep portions of said plurality of grooves is in the range between 0.05 and 0.25.

21. Device according to claim 19, in which said deep portions of said plurality of grooves measure 0.0001 to 0.0003 inches in depth and said shallow portions of said plurality of grooves measure 0.00001 to 0.0001 inches in depth.

22. Device for sealing a fluid at a space between a housing and a rotatable shaft, comprising a first seal ring, mounted on said shaft for rotation therewith and having a planar front sealing surface, a second seal ring, being substantially coaxial with said first seal ring and having a planar sealing surface defining a clearance with said first seal ring planar front sealing surface, one of said seal rings being axially movable, said axially movable seal ring being acted upon by said fluid to close said clearance, an elastic means, connected between said housing and said axially movable seal ring for biasing said axially movable seal ring towards other said seal ring to close said clearance, one of said planar sealing surfaces having a plurality of grooves formed therein for introducing said fluid between said planar sealing surfaces to thereby urge said planar sealing surfaces away from each other, said grooves arranged in spaced relation to each other, having a first relatively deep and substantially angled portion extending inwardly from a first circumference of said planar surface and a second relatively shallow and substantially radial portion in an abutment with said first relatively deep portion, said second portion projecting solely radially inwardly and having straight sides, said abutment being an abrupt step-like change in groove depth where said first and second groove portions meet, said relatively shallow portion being separated by an annular ungrooved surface from a second circumference of said grooved planer sealing surface, and said first circumference communicating with said fluid.

* * * * *

UNITED STATES PATENT AND TRADEMARK OFFICE
CERTIFICATE OF CORRECTION

PATENT NO. : 5 722 665
DATED      : March 3, 1998
INVENTOR(S) : Josef SEDY et al It is certified that error appears in the above-indentified patent and that said Letters Patent is hereby corrected as shown below:

On the title page, item [73]; change "Assignee: Durametallic Corporation, Kalamazoo, Mich." to ---Assignees: Durametallic Corporation, Kalamazoo, Mich. and John Crane, Inc., Morton Grove, Ill.---

Signed and Sealed this

Twenty-eighth Day of July, 1998

Attest:

BRUCE LEHMAN

*Attesting Officer*     *Commissioner of Patents and Trademarks*